(12) United States Patent
Weinhold

(10) Patent No.: US 7,364,205 B2
(45) Date of Patent: Apr. 29, 2008

(54) COUPLING FOR A STEEL SPIRAL FLEXIBLE HOSE

(76) Inventor: Karl Weinhold, Im Jagdfeld 42, 41464 Neuss (DE)

( * ) Notice: Subject to any disclaimer, the term of this patent is extended or adjusted under 35 U.S.C. 154(b) by 141 days.

(21) Appl. No.: 10/540,364

(22) PCT Filed: Dec. 8, 2003

(86) PCT No.: PCT/EP03/13890

§ 371 (c)(1),
(2), (4) Date: Jun. 23, 2005

(87) PCT Pub. No.: WO2004/059203

PCT Pub. Date: Jul. 15, 2004

(65) Prior Publication Data

US 2006/0130287 A1   Jun. 22, 2006

(30) Foreign Application Priority Data

Dec. 23, 2002 (DE) ................. 102 61 557

(51) Int. Cl.
*F16L 33/00* (2006.01)

(52) U.S. Cl. ............. 285/252; 285/903; 285/373; 285/419; 285/420

(58) Field of Classification Search ........... 285/903, 285/409, 252, 254, 253, 419, 420, 411, 373
See application file for complete search history.

(56) References Cited

U.S. PATENT DOCUMENTS

| | | | | |
|---|---|---|---|---|
| 2,166,524 A | * | 7/1939 | Goodall | 285/253 |
| 3,495,855 A | * | 2/1970 | Currie | 285/253 |
| 4,443,031 A | * | 4/1984 | Borsh et al. | 285/419 |
| 4,593,942 A | * | 6/1986 | Loker | 285/253 |
| 4,687,234 A | * | 8/1987 | Weinhold | 285/244 |
| 4,919,462 A | * | 4/1990 | Matsui et al. | 285/149.1 |
| 5,330,233 A | * | 7/1994 | Kress | 285/9.2 |
| 5,984,375 A | * | 11/1999 | Merrett | 285/253 |
| 6,254,145 B1 | * | 7/2001 | Schwarz et al. | 285/319 |
| 6,659,510 B1 | * | 12/2003 | Ikegami et al. | 285/243 |

FOREIGN PATENT DOCUMENTS

| | | | | |
|---|---|---|---|---|
| DE | 179711 | | 12/1906 | |
| DE | 881287 | | 6/1953 | |
| DE | 1913 506 | | 3/1969 | |
| DE | 102 61 557.8-12 | | 5/2003 | |
| EP | 1153236 | | 11/2001 | |
| FR | 2645616 | * | 4/1989 | 285/903 |
| GB | 2180904 | * | 4/1987 | 285/903 |
| JP | 02245594 A | | 10/1990 | |
| JP | 3199797 | * | 8/1991 | 285/903 |

* cited by examiner

*Primary Examiner*—David Bochna
(74) *Attorney, Agent, or Firm*—The Webb Law Firm

(57) ABSTRACT

Disclosed is a coupling for a spiral wire flexible hose. The coupling includes a ring clamp configured as a clamping jaw and including at least two partial shells enclosing a sleeve of the spiral wire flexible hose. The ring clamp has an inner contour having a spiral to receive a spiral wire flexible hose in a positive locking engagement. The hose is adapted to receive a spout therein. The spiral extends up to a protrusion situated at the end of the ring clamp. The spout is clamped such that the spout is axially immovable.

20 Claims, 3 Drawing Sheets

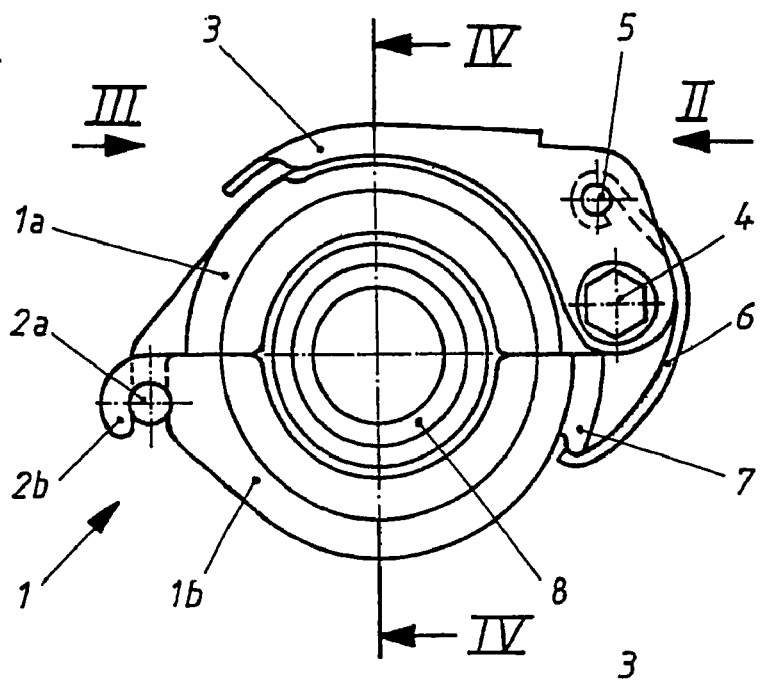
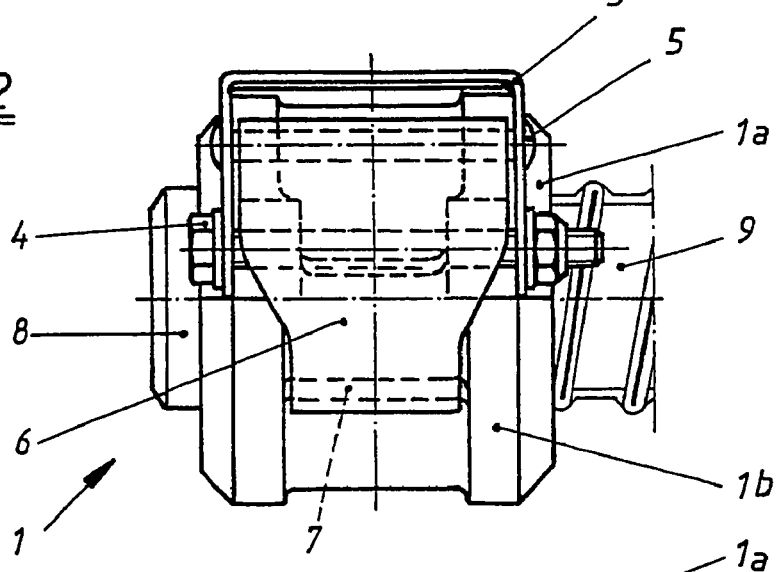
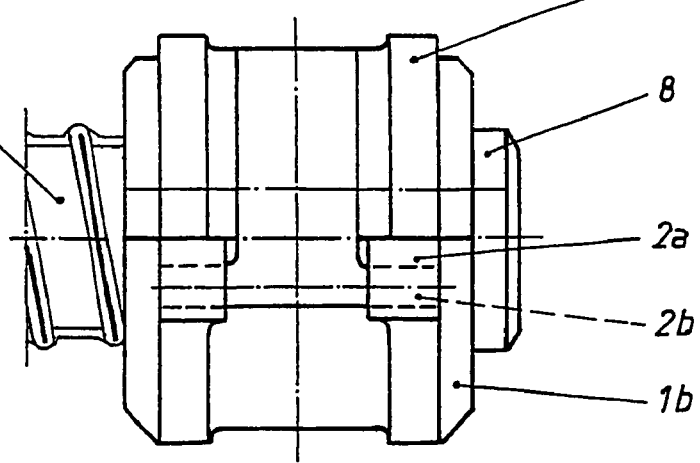

Fig. 5
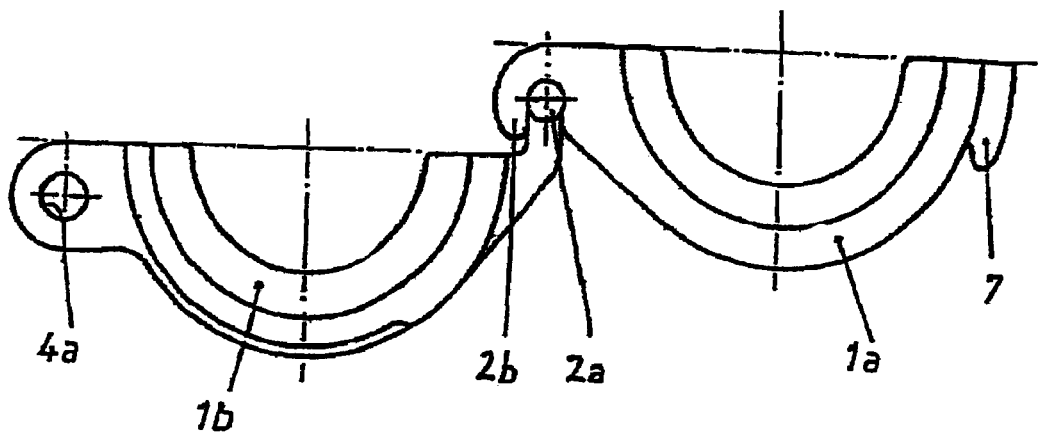
Fig. 6
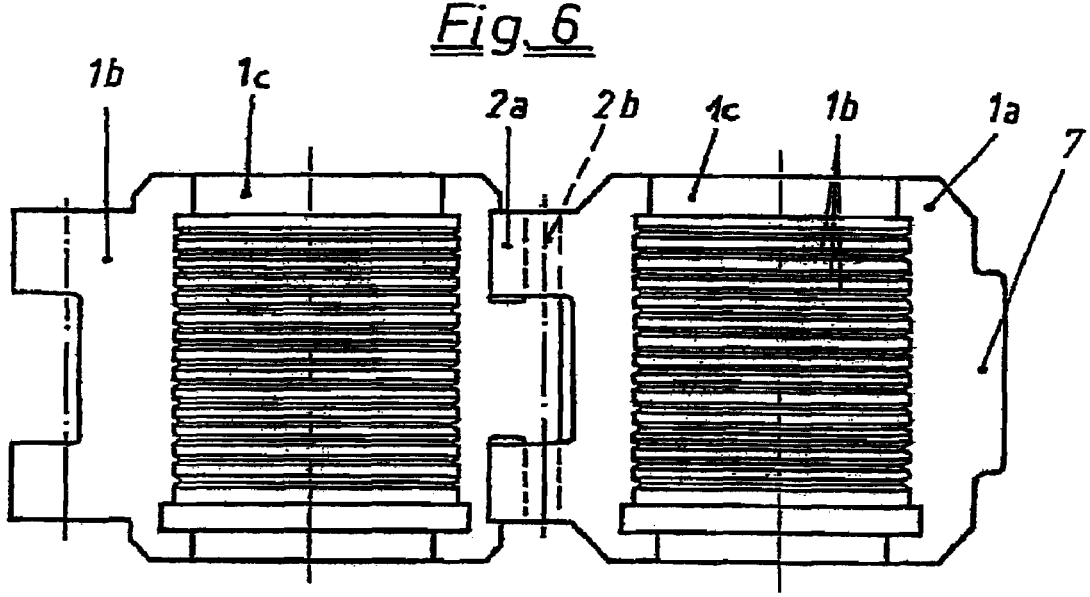
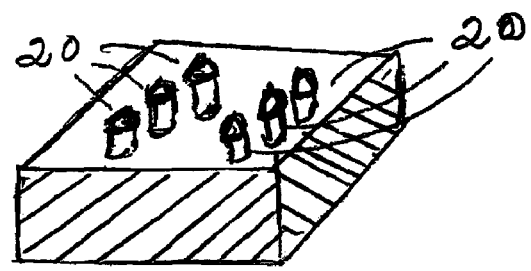
Fig. 7

COUPLING FOR A STEEL SPIRAL FLEXIBLE HOSE

BACKGROUND OF THE INVENTION

1. Field of the Invention

The invention relates to a coupling for spiral wire flexible hoses having a ring clamp conformed as a clamping jaw and including at least two partial shells enclosing the hose, which clamp has an inner contour that encloses in positive locking engagement a spiral wire flexible hose that is placed over a spout.

2. Description of Related Art

A wide variety of designs for hose couplings are known. A coupling for spiral wire flexible hoses, that is to say hoses that are fitted internally with a spiral steel wire for stiffening, is known for example from European Patent No. EP 1 153 236 B1. This coupling, which also originated from the applicant for the present invention, has a ring clamp which is injection moulded in a single plastic part, in which a round thread with a corresponding pitch is moulded in the ring clamp part. This known coupling accordingly has the drawback that the ring clamp is only suitable for use with a very specific hose having a very specific pitch of the steel winding. Since many different spiral wire flexible hoses made by various manufacturers are commercially available and the hoses offered include differing pitches of the steel winding, the application of the known coupling is limited to those hoses whose pitch matches the pitch of the round thread moulded into the ring clamp part.

SUMMARY OF THE INVENTION

The object underlying the invention is therefore to improve and design the coupling armature presented in the introduction and described in detail previously in such a way that it is capable of being used with spiral wire flexible hoses having very widely differing pitches.

This object is solved according to the invention in that a spiral is provided that encircles the spiral wire flexible hose several times in the area of the spout up to a protrusion at the end of the ring clamp and is clamped by the clamp so as to be axially immovable.

The invention considered that a universally usable coupling may be created if the spiral gap in the area of the coupling is filled on the outer circumference of a spiral wire flexible hose with a flexible spiral having a "variable pitch" between the steel wire, for example by plastic injection moulding. When the coupling armature is closed, this spiral then fills the annular cavity around the spiral wire flexible hose between the spout flange and the protrusion at the end of the ring clamp, so that the protrusion is reliably clamped by the clamp, which is conformed as a clamp jaw.

To enable the coupling according to the invention to be used as a rapid-fit coupling, a clamping lever is provided that is attached to the free circumferential end of one of the partial shells via a bolt, and may be connected via a recoil spring to the other free circumferential end of the corresponding partial shell to create non-positive locking engagement between the spiral wire flexible hose and the ring clamp. This design is particularly practical because the quick-clamping armature that is known per se also functions with the novel coupling.

A further design of the invention provides that the ring clamp is injection moulded in plastic. In this way, both partial shells may be fabricated as separate parts, however it is also possible to produce the two partial shells as a single part, the connection between the two partial shells then being most practically a film hinge.

As was indicated earlier, the spiral is preferably made from plastic, in which case it is appropriate if the spiral for connecting a static charge is manufactured from an electrically conductive plastic, such as PEHD. It is preferably designed as an endless spiral, which then only needs to be shortened to adapt it to the respective application. It is readily evident that—within certain limits—such a plastic spiral may also be adapted to different sleeve diameters as well as the differing pitches of various steel windings.

According to a further advantageous refinement of the invention, the spiral has an essentially rectangular cross-section and a centrally located ridge-like protrusion on the inner side thereof.

In order to assure firm gripping between the spiral and the ring clamp, the ring clamp has an inner profile that enables a positive locking connection. Unlike the known coupling armature, however, this positive locking arrangement is independent of the shape of the sleeve end to be clamped. According to the invention, it is possible that the inner contour of the partial shell may include ridges running concentrically or in a manner of a thread, which preferably have a triangular cross-section and are pressed into the plastic material of the spiral being used during the clamping operation, thereby assuring firm lock of the sleeve in the axial direction. Alternatively, instead of the ridges it is also conceivable to provide a plurality of peg-like or knob-like projections distributed evenly over the inner contour of the ring clamp.

In order to obtain a secure connection between the ring clamp and the spout that is inserted into the end of the sleeve, the ring clamp is provided in known manner with an annular groove at the extremity thereof, in which a flange of the spout constructed as an annular flange is seated.

BRIEF DESCRIPTION OF THE DRAWINGS

In the following, the invention will explained in greater detail with reference to a drawing showing just one preferred embodiment thereof. In the drawing:

FIG. 1 shows a front view of a coupling according to the invention

FIG. 2 shows a side view of the coupling of FIG. 1 in the direction of arrow II in FIG. 1, FIG. 3 shows a side view of the coupling of FIG. 1 in the direction of arrow III in FIG. 1, but without a clamping lever, FIG. 6 shows a top view of the ring clamp of FIG. 5.

FIG. 7 is an isometric view of a segment of one of the partial shells of the ring clamp of the invention showing peg-like projections on the inner surface of the shell.

DESCRIPTION OF THE PREFERRED EMBODIMENTS

Figure 4A:
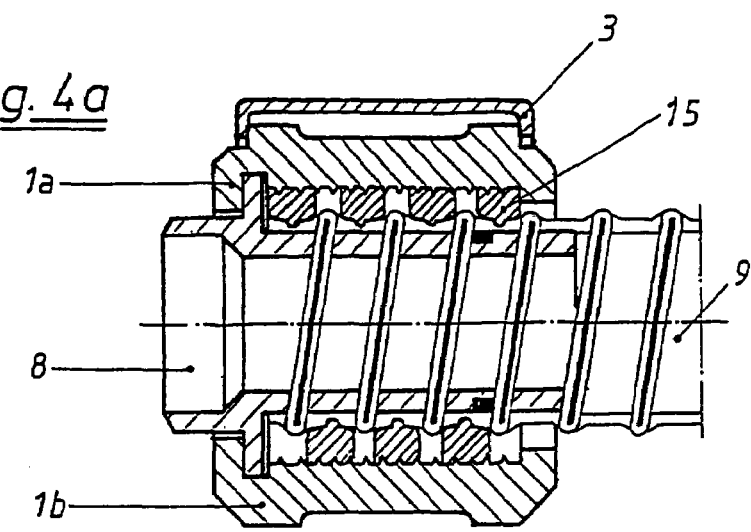
FIG. 4A shows a vertical cross-section of the coupling of FIG. 1 along line IV-IV in FIG. 1.

FIGS. 1 to 3 show three different views of the coupling according to the invention. The central component of the coupling is a ring clamp 1, which in the illustrated and for these purposed preferred embodiment is made from two separate partial shells 1a and 1b. As is evident particularly from FIGS. 1 and 3, the two partial shells as attached to each other via a joint 2, in which one end of partial shell 1a is furnished with two integrally conformed pins 2a, which are clasped in hooking fashion by a correspondingly shaped lug 2b of partial shell 1b.

The coupling shown in the preferred embodiment is further furnished with a convenient quick clamping device, according to which ring clamp 1 is furnished with a clamping lever 3 at the free circumferential end of partial shell 1a, which lever is articulated to as to be pivotable on partial shell 1a via a bolt 4, as may be seen in FIGS. 1 and 2. Clamping lever 3 also has a pin 5 that is used for attaching the end of a recoil spring. The free end of recoil spring 6 is also shaped such that it cooperates with a lug 7 arranged on partial shell 1b to apply the necessary closing force, as is shown clearly in FIG. 1.

A spout 8, which is inserted into the end of a spiral wire flexible hose 9 is used to apply the clamping force essential for a secure attachment. The operating principle of the coupling according to the invention may be described particularly with reference to FIGS. 4a and 4b. The spiral wire flexible hose 9 is furnished with a pitch conformed correspondingly with the steel wire 10 located therein, the size of which may vary depending on the manufacturer of the steel wound sleeve, even for the same diameter. In order to withstand the necessary axial tension, spout 8 must also be in positive locking engagement with ring clamp 1. For this purpose, spout 8 is equipped with a flange that is axially fixed, and which is preferably conformed as annular flange 11 and is seated in an annular groove 12 in ring clamp 1.

In order to ensure reliable insulation between spout 8 and spiral wire flexible hose 9, spout 8 has an annular groove 13, into which a seal is inserted, and which has the form of an O-ring cord 14 in the embodiment shown. It is evident from this that the diameter of the O-ring cord 14 is adapted to match annular groove 13 in such manner that O-ring cord 14 protrudes above the outer diameter of spout 8.

A spiral 15 is also provided according to the invention that encircles the spiral wire flexible hose 9 several times in the area of spout 8 up to a projection 1c of ring clamp 1 and is clamped by ring clamp 1 so as to be axially immovable. In the embodiment that is shown, and preferred for these purpose, the windings encircle the sleeve 3½ times, thereby filling the entire internal area of ring clamp 1. Because the inner contour of ring clamp 1 is provided with ridge-like projections 16 that have a triangular and thus jagged cross-section, when the coupling is closed, spiral 15, which is preferably made from an electrically conductive plastic, is squeezed so that any axial movement is impossible, thereby ensuring that connection of the coupling armature according to the invention is entirely secure.

Figure 4B:
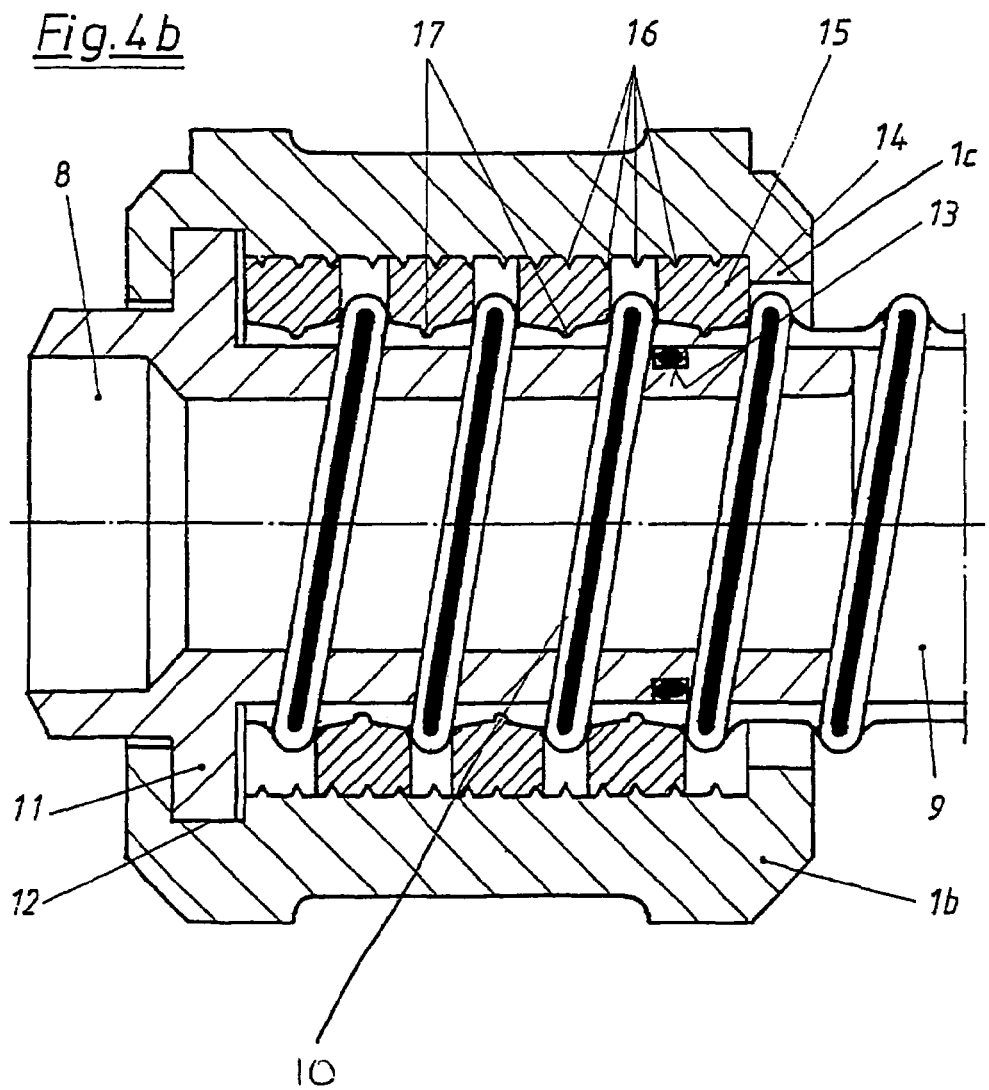
FIG. 4B is an enlarged illustration of the coupling of FIG. 4a, FIG. 5 is a front view the ring clamp of the coupling according to the invention in the open position

It is further evident from FIGS. 4a and 4b that the spiral has an essentially rectangular cross-section and also has a ridge-like protrusion 17 arranged centrally on its inside. This enables the spiral to be fitted optimally to the end of the spiral wire flexible hose 9.

Finally, the construction of the partial shells 1a and 1b used is shown again in detail in FIGS. 5 and 6. Here, the articulated connection between the two partial shells via pin/lug fixture 2a/2b is clearly evident. Two round openings 4a at the free end of partial shell 1b are also visible, and these serve to accommodate bolt 4 for attaching clamping lever 3. Circumferential projection 1c in ring clamp 1 is also visible again in the plan view according to FIG. 6.

In the embodiment shown, the inner profile of partial shells 1a and 1b is provided with concentric ribs 16, which have a rectangular cross-section and thus assure a particularly effective clamping action with the spiral to be inserted. As can be appreciated by those skilled in the art, rather than concentric ridges 16, these projections may also be ridges running in the manner of a thread or may be peg-like or knob-like projections (identified by the number 20 in FIG. 7) distributed evenly over the inner contours of partial shells 1a and 1b. The important point is simply that a reliable positive locking engagement with the spiral to the clamped is assured.

The invention claimed is:

1. A coupling for a spiral wire flexible hose, wherein the coupling comprises:
   a ring clamp configured as a clamping jaw and including at least two partial shells enclosing a sleeve of the spiral wire flexible hose, wherein the ring clamp has an inner contour having a spiral to receive a spiral wire flexible hose in a positive locking engagement, wherein the hose is adapted to receive a spout therein, wherein the spiral has a variable pitch and extends up to a protrusion situated at the end of the ring clamp, whereby the spout is clamped such that the spout is axially immovable.

2. A coupling for a spiral wire flexible hose, wherein the coupling comprises:
   a ring clamp configured as a clamping jaw and including at least two partial shells enclosing a sleeve of the spiral wire flexible hose, wherein the ring clamp has an inner contour having a spiral to receive a spiral wire flexible hose in a positive locking engagement, wherein the hose is adapted to receive a spout therein, wherein the spiral has a variable pitch and extends up to a protrusion situated at the end of the ring clamp, whereby the spout is clamped such that the spout is axially immovable, and
   a clamping lever attached to free circumferential end of one of the partial shells via a bolt, and one end of a recoil spring pivotally mounted to the clamping lever, the recoil spring having an opposite free end wherein with the free end of the recoil spring connected to the other free circumferential end of the corresponding partial shell a non-positive locking engagement is provided between the steel wound sleeve and the ring clamp.

3. The coupling according to claim 2, wherein the ring clamp is injection molded from plastic.

4. The coupling according to claim 3, wherein the at least two partial shells of the ring clamp are attached to each other.

5. The coupling according to claim 2, wherein the spiral is constructed from plastic.

6. The coupling according to claim 5, wherein the plastic is electrically conductive.

7. The coupling according to claim 6, wherein the spiral includes a centrally located ridge-like protrusion situated on an inner surface thereof.

8. The coupling according to claim 2, wherein the spiral has an essentially rectangular cross-section.

9. The coupling according to claim 2, wherein the inner contour of the partial shells has concentric ridges.

10. The coupling according to claim 9, wherein the ridges have a triangular cross-section.

11. The coupling according to claim 2, wherein the inner contour of the partial shells has interspaced ridges.

12. The coupling according to claim 11, wherein the ridges have a triangular cross-section.

13. The coupling according to claim 2, wherein the inner contour of the partial shells has a plurality of peg-like projections.

14. The coupling according to claim 13, wherein the inner contour of the partial shells has interspaced ridges and one of the ridges and the projections have a triangular cross-section.

15. The coupling according to claim 2, wherein the spout has a flange configured as an annular flange and the partial shells have an annular groove inside the clamping jaw provided to accommodate the annular flange.

16. The coupling according to claim 2, wherein the spout has an annular groove wherein a seal is situated in the area over which the sleeve end of the spiral wire flexible hose is situated.

17. The coupling according to claim 16, wherein the seal is an O-ring cord.

18. The coupling according to claim 2, wherein the clamping lever is constructed of stainless steel.

19. The coupling according to claim 2, wherein the at least two partial shells are two shells and each of the partial shells of the ring clamp having the free circumferential end and an opposite second circumferential end having one part of a pin and groove locking arrangement; the second circumferential end of one of the shells having the pin and the second circumferential end of the other shell having the groove, wherein with the pin in the groove, the shells are pivotally mounted to move the free circumferential ends of the shells toward and away from one another.

20. A coupling for a spiral wire flexible hose wherein the coupling comprises:
 a ring clamp configured as a clamping jaw and including at least two partial shells enclosing a sleeve of the spiral wire flexible hose, wherein the ring clamp has an inner contour having a spiral to receive a spiral wire flexible hose in a positive locking engagement, wherein the hose is adapted to receive a spout therein, wherein the spiral extends up to a protrusion situated at the end of the ring clamp, whereby the spout is clamped such that the spout is axially immovable;
 a clamping lever attached to free circumferential end of one of the partial shells via a bolt, and connected via a recoil spring to other free circumferential end of the corresponding partial shell to create non-positive locking engagement between the steel wound sleeve and the ring clamp, and
 wherein the recoil spring is articulated on a pin arranged parallel to the bolt, wherein at least one of the bolt, the pin, and the recoil spring are constructed of rustproof steel.

* * * * *